| United States Patent [19] | [11] Patent Number: 4,757,695 |
|---|---|
| Malnar | [45] Date of Patent: Jul. 19, 1988 |

[54] CONDENSER FOR REFRIGERATION APPARATUS

[76] Inventor: Dusan Malnar, 1404-7 Evergreen Pl., Winnepeg, Manitoba, Canada, R3L 2T3

[21] Appl. No.: 29,643

[22] Filed: Mar. 24, 1987

[51] Int. Cl.$^4$ .............................................. F28D 5/00
[52] U.S. Cl. ...................................... 62/305; 165/116
[58] Field of Search ................... 62/305; 165/110, 115, 165/117

[56] References Cited

U.S. PATENT DOCUMENTS 1,957,036  5/1934  Baars et al. ........................ 165/110

FOREIGN PATENT DOCUMENTS 139364  4/1920  United Kingdom ................ 165/117

*Primary Examiner*—Henry A. Bennet
*Attorney, Agent, or Firm*—Stanley G. Ade; Adrian D. Battison; Murray E. Thrift

[57] ABSTRACT

A condenser is formed from a plurality of pipes connected to a header with each pipe formed to define a lowermost straight portion on which a plurality of convoluted further straight portions are provided in the same vertical plane. Each straight portion is connected to the next by a curved connecting portion of a radius of curvature substantially equal to the spacing between each straight portion and the next straight portion so that the connecting portion extends to a height above the upper straight portion to which it is connected to. This ensures that each straight portion acts as a liquid trap to retain the condensate therein with the condensate and gas being bubbled over each connecting portion to move into the next liquid trap. The gas is injected at the lower header and the liquid extracted at the upper header. This tends to keep the inner surface of the pipe wetted with the condensate thus improving heat transfer and reducing the overall size of the condenser.

13 Claims, 1 Drawing Sheet

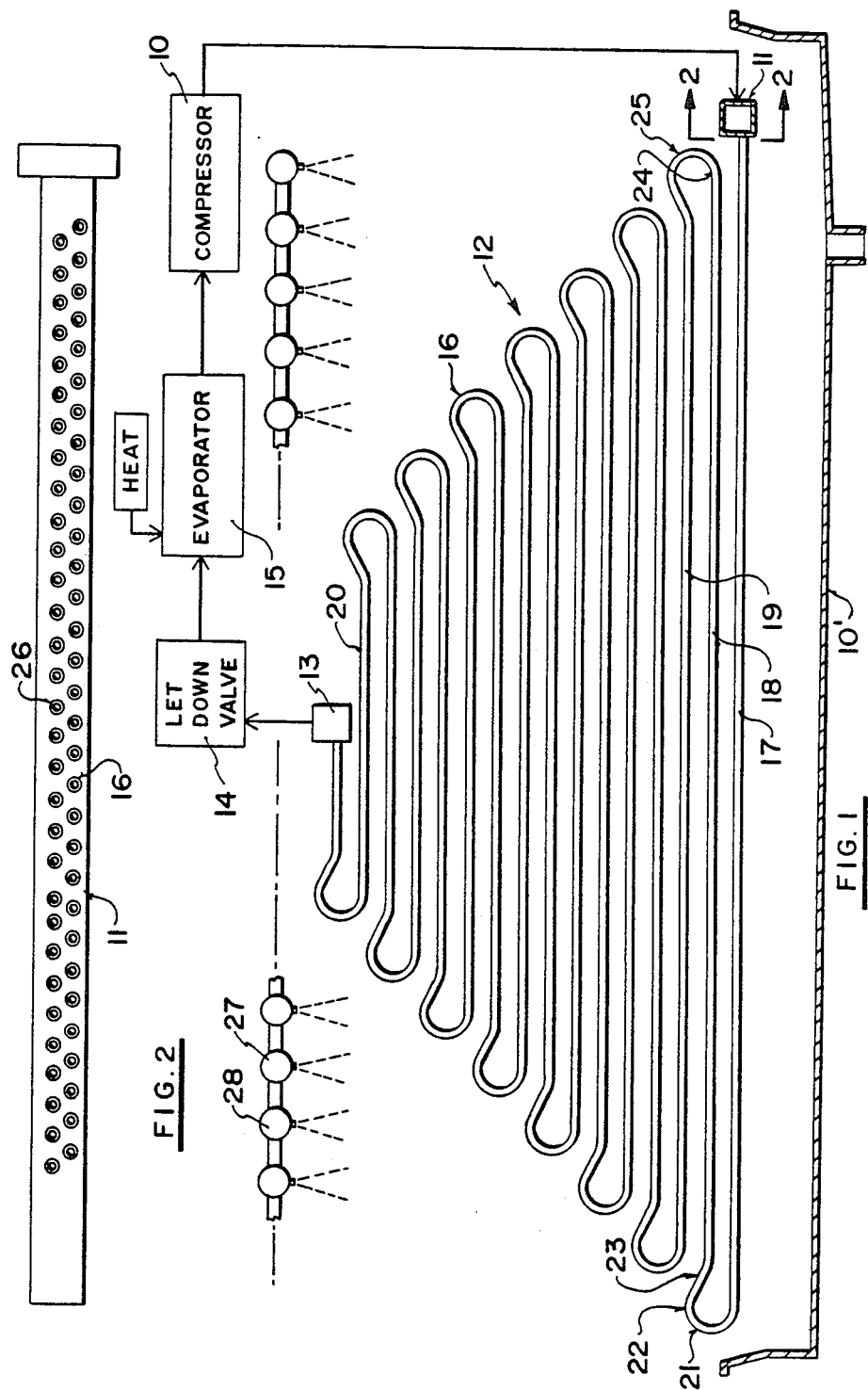

CONDENSER FOR REFRIGERATION APPARATUS

BACKGROUND OF THE INVENTION

This invention relates to a condenser which is particularly designed for use with a refrigeration apparatus of the type in which a refrigerant fluid in gaseous form is compressed to pressurize the gas and then passed through a condenser under pressure in which the gas is cooled to form a liquid phase which is subsequently expanded and allowed to evaporate thus extracting heat from the area surrounding the evaporator. Such arrangements can be used in a refrigeration apparatus or in a heat pump apparatus to transfer heat between the evaporator section and the condenser section in a well known manner.

Condensers for apparatus of this type generally comprise a simple tube or pipe which is bent to form convolutions. The gas under pressure is fed to an upper end of the pipe with the gas gradually passing through the pipe, gradually cooling and thus reaching the dew point at which it condenses in the pipe. The liquid thus formed runs down the pipe to be collected at the lower end for further circulation through the circuit. Such condensers can be provided by a simple single pipe or a much larger arrangements can include a header which connects to a number of separate pipes running in convoluted path in generally parallel relation from the upper gas injection header to the lower liquid collection header. In many cases cooling of the outer surface of the pipe is carried out merely by convection of air from the outer surface. In with this case fins can be provided to assist in transferring heat from the pipe to the air. In other cases water can be sprayed onto the outer surface of the pipes.

In any apparatus or plant of this type, the size of the condenser is a significant cost in the total plant cost. It is therefore an ongoing objective to improve the efficiency of the condenser so that its size and therefore cost can be significantly reduced.

SUMMARY OF THE INVENTION

It is therefore one object of the invention, therefore, to provide a condenser which has improved thermodynamic efficiency and thus enables the manufacture of a condenser of smaller size and significantly reduced cost.

Generally the invention therefore provides a condenser in the form of a plurality of horizontal pipe lengths each of which is connected to the next adjacent pipe portions by an upwardly curved connection thus forming in each pipe length a liquid trap so the liquid tends to sit in that pipe portion rather than run from each pipe portion to the next. It is only therefore by movement of gas that the liquid is pumped or percolated from each trap portion to the next trap portion and eventually to the outlet. Most preferably the outlet is provided at the upper end rather than the lower end which is conventional.

This technique of trapping the liquid in the horizontal portions throughout the height of the condenser causes the liquid and gas to bubble along the pipe with alternate sections of gas and liquid. This bubbling and gradual movement of liquid along the pipe keeps the inner surface of the pipe wet which has been found most surprisingly to provide an increase in thermodynamic efficiency effectively doubling the heat transfer from the fluid within the pipe to the outer surface and thus to the outside coolant.

It will be noted that in the conventional arrangement in which the liquid runs to the bottom, effectively the whole of the pipe at the lower end is liquid and thus the pipe is wetted. However the pipe and liquid at that point are of course at the lowest temperature and thus require the least heat transfer. At the upper portion of the pipe, the fluid within the pipe is effectively wholly gas and thus the inside wall or surface of the pipe is effectively dry and the heat transfer must occur between the dry wall and the dry gas which has been found by the present inventor to be relatively inefficient transfer.

A further advantage of the present arrangement is that when using water spray coolant, the water sprays onto the cooler parts of the pipe thus reducing water evaporation and loss.

In a particularly preferred arrangement, the pipe connections are formed by curved portions of a diameter of curvature greater than the spacing between the pipe portion of the next adjacent portion so that the curvature starts at level of the lower pipe portion and then reaches a height above the upper pipe portion then curves downwardly to smoothly connect with the upper pipe portion. In addition the length of the pipe portions or traps can be gradually reduced from the lowermost to the uppermost thus staggering the end connections so they are available for vertical spraying of water onto the connections where a cooling requirement is particularly advantageous.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is a side elevational view of a condenser according to the invention showing also the refrigeration system schematically.

FIG. 2 is a cross sectional view along the lines 2—2 of FIG. 1.

In the drawings like characters of reference indicate corresponding parts in the different figures.

DETAILED DESCRIPTION

The refrigeration circuit shown in FIG. 1 comprises a compressor 10, a header 11 to which the compressed hot gas is supplied, a condenser 12, an outlet header 13 at which cooled refrigerant liquid is received, a letdown valve 14 at which the pressure in the liquid is released and an evaporator 15 in which the liquid released from pressure evaporates extracting heat from the surrounding environment.

The condenser 12 incorporates the headers 11 and 13 and a plurality of individual pipes 16, one of which is shown in side elevation in FIG. 1 and the plurality of which are shown in FIG. 2. The header 11 comprises a rectangular elongate tubular member to which the compressed gas can be supplied either at one end or more preferably at a central position to provide a balance flow to each of the tubes 16 etc.

Each of the tubes 16 comprises a plurality of substantially horizontal tube portions indicated at 17, 18, 19 et seq. Each successive elongate portion is of a reduced length so the lowermost portion 17 is of the longest extent as a uppermost portion 20 is of the shortest extent. The portions thus form a convoluted path with each connected to the next adjacent at respective adjacent ends thereof. The connection is provided by a curved connection portion one of which is indicated at 21 with the remaining connection portions being substantially identical thereto. Each of the connection portions comprises a curved portion having a radius of curvature substantially equal to the spacing between each straight portion and the next adjacent straight portion so that the curved portion extends upwardly beyond the height of the upper straight portion to a section indicated at 22, the height above the second straight portion being approximately equal to the spacing between the straight portions. The connection portion is thus smoothly curved and then extends downwardly toward the second straight portion as indicated at 23 and smoothly connects therewith.

Thus it will be noted that each straight portion has at its respective ends an upwardly curved portion indicated at 23 and indicated at 24 at the righthand end of the upper portion 18. This acts as a liquid trap so that any liquid sitting in the straight portion 18 must remain in that portion until forced outwardly therefrom by gas pressure.

Each of the straight portions is, as illustrated directly horizontal and each lies in a vertical plane containing all of the pipe 12. Each next adjacent connection portion 21 is staggered inwardly from the previous by the reducing lengths of the straight portions 17 through 20. This enables the height of the whole pipe to be reduced since for example the pipe 19 lies at a height lower than otherwise would be possible if it extended out to the same extent as the connecting portion indicated at 25.

In an alternative arrangement (not shown) the straight portions 17, 18, 19 et seq. are slightly inclined to the horizontal so that liquid is caused to run toward one end or the other end to form a complete layer across the pipe rather than a thin layer at the lower edge of the pipe as may occur with a directly horizontal type pipe.

From FIG. 2 it will be noted that next adjacent pipes, one of which is indicated next to the pipe 16 at 26 are slightly offset to lie a small amount higher than the pipe 16 thus enabling a reduction in width of the whole unit since the pipes are arranged alternately slightly offset as is clearly visible in FIG. 2.

In operation the gas is injected through the header 11 into the pipe 16 and gradually commences condensing as it moves upwardly through the convoluted pipe. As liquid tends to form by condensation within the pipe, it forms blockages across the pipe which are pushed forwardly by the following gas pressure. At each end of each liquid trap, the liquid and gas act in the manner of a percolator so that the gas bubbles past the liquid and at the same time forces the liquid over the raised connecting portions which define the trap. The liquid is thus gradually forced upwardly into, through and past each liquid trap in turn with more and more liquid being generated as the gas cools and reaches the upper portion 20 of the pipe.

This gradual forward movement of the liquid in the pipe ensures that the whole of the inner surface of the pipe is maintained in a wet condition thus significantly improving heat transfer.

In a particularly preferred arrangement a cooling fluid in this case water is applied to the pipes by a spray system generally indicated at 27. The spray sytem includes a water supply pipe which connects to a plurality of nozzles schematically indicated at 28 which spray downwardly onto the pipes. It will be noted firstly that each of the curved connecting portions is exposed to direct flow of the cooling water. This ensures that the curved connecting portions are maintained properly cooled so as to generate condensate at that point which thus is pushed in bubbles over the liquid trap into the next adjacent straight portion.

A further point which should be noted is that the water first engages the uppermost portions of the pipe at which the fluid therein is at its lowest temperature rather than the highest temperature in the portion 17. The water applied to the pipe is therefore gradually heated as it runs down from each pipe portion to the next thus reducing evaporation.

One surprising effect of this invention is that despite the presence during operation of the condenser of liquid and gas in the pipes, when it is necessary to disassemble the unit for service or the like, no liquid remains in the condenser. It will be appreciated that particularly using ammonia as the fluid, the presence of any remaining liquid ammonia would be highly dangerous. In practice, no liquid has been found to escape even when no shut-off valves are provided in the system.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. In a refrigeration apparatus comprising a circuit for a refrigerant fluid having an evaporator, a compressor for compressing the evaporated refrigerant fluid and a condenser for causing condensation of the compressed fluid, the condenser comprising a pipe having an inlet end and an outlet end, means on the inlet end for injecting fluid in gaseous phase under pressure into the pipe for condensation within the pipe to form a liquid phase, and means at the outlet end for receiving said condensed liquid phase, an outer surface of the pipe being arranged to engage a coolant fluid for cooling the outer surface and said fluid within the pipe, the pipe extending continuously from said inlet end to said outlet end and having a substantially constant cross-section area therealong and being shaped by bending to form a plurality of pipe portions each pipe portion lying in a substantially horizontal plane and a plurality of junction portions, each junction portion connecting a respective end of a respective one of the pipe portions to a next adjacent pipe portion, each of said junction portions defining a path which extends solely between said respective one of the pipe portions and said adjacent pipe portion and which includes a part thereof which extends to a height above both said respective one of said pipe portions and adjacent pipe portion so as to form a liquid trap.

2. The invention according to claim 1 wherein said height is arranged so as to allow the flow of gas phase to force liquid and gas in mixed phase to move along said respective one of said pipe portions and over said height into said next adjacent pipe portion.

3. The invention according to claim 1 wherein each pipe portion is arranged at a height above a previous pipe portion.

4. The invention according to claim 3 wherein said means on the inlet end is arranged at a lower height relative to said means on the outlet end.

5. The invention according to claim 3 wherein said pipe portions are arranged so as to lie mutually parallel and in a substantially vertical plane.

6. The invention according to claim 1 wherein said next adjacent pipe portion lies parallel to said respective one of said pipe portions and extends therefrom in opposite direction so as to define ends thereof lying closely adjacent, said junction portion interconnecting said ends and forming a curved pipe portion having a diameter of curvature greater than the spacing between said pipe portions so as to define said part thereof which lies above said next adjacent pipe portion so as to connect smoothly therewith.

7. The invention according to claim 6 wherein said pipe portions define a convoluted stack of pipe portions lying mutually parallel and in a substantially vertical plane with each junction portion from one pipe portion to the next adjacent pipe portion having a diameter of curvature greater than the spacing between said one pipe portion and the next adjacent pipe portion so as to define said height above said next adjacent pipe portion.

8. The invention according to claim 7 wherein each of said pipe portions from a lowermost one thereof to an uppermost one thereof is of reduced length so that the junction portions are staggered inwardly leaving each of the junction portions exposed to vertical movement of said coolant fluid.

9. The invention according to claim 8 including means for spraying a liquid coolant onto said outer surface of said pipe.

10. The invention according to claim 1 wherein each of said pipe portions is straight.

11. The invention according to claim 1 wherein each said pipe portion is shaped so that any deviation in height thereof in height from a horizontal plane including the ends thereof is less than said height of said junction portions.

12. The invention according to claim 1 wherein said means at the inlet end and said means at the outlet end each comprise a header and wherein there is provided a plurality of further pipes generally parallel to said pipe an lying side by side therewith.

13. The invention according to claim 1 wherein said pipe has a length greater than 100 feet.

* * * * *